(12) United States Patent
Itou et al.

(10) Patent No.: US 7,395,489 B2
(45) Date of Patent: Jul. 1, 2008

(54) CONTROL SYSTEM AND MEMORY CONTROL METHOD EXECUTING A DETECTION OF AN ERROR IN A FORMATION IN PARALLEL WITH READING OPERATION

(75) Inventors: Daisuke Itou, Kawasaki (JP); Masaki Ukai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 553 days.

(21) Appl. No.: 10/340,641

(22) Filed: Jan. 13, 2003

(65) Prior Publication Data

US 2004/0001269 A1 Jan. 1, 2004

(30) Foreign Application Priority Data

Jun. 28, 2002 (JP) .............................. 2002-189770

(51) Int. Cl.
*G11C 29/00* (2006.01)
*H03M 13/00* (2006.01)
(52) U.S. Cl. ..................... 714/773; 714/764; 714/768
(58) Field of Classification Search ............... 714/764, 714/768, 773
See application file for complete search history.

(56) References Cited

U.S. PATENT DOCUMENTS

| 4,612,640 | A  | * | 9/1986  | Mehrotra et al. ............ 714/766 |
| 5,434,775 | A  | * | 7/1995  | Sims et al. ..................... 705/8 |
| 5,680,571 | A  | * | 10/1997 | Bauman ....................... 711/122 |
| 5,867,511 | A  | * | 2/1999  | Arimilli et al. ............... 714/805 |
| 5,901,281 | A  | * | 5/1999  | Miyao et al. .................. 714/11 |
| 6,553,457 | B1 | * | 4/2003  | Wilkins et al. ............... 711/113 |
| 6,772,383 | B1 | * | 8/2004  | Quach et al. ................. 714/746 |
| 6,802,039 | B1 | * | 10/2004 | Quach et al. ................. 714/763 |
| 6,848,070 | B1 | * | 1/2005  | Kumar ........................ 714/758 |

FOREIGN PATENT DOCUMENTS

| JP | 60-079450 | 5/1985  |
| JP | 06-324943 | 11/1994 |

OTHER PUBLICATIONS

Stephen B. Wicker, "Error control Systems for Digital Communications and Storage", Prentice-Hall, 1995, pp. 116-121.*
Japanese Office Action dated Jul. 3, 2007 for corresponding Japanese Patent Application No. 2002-189770 (3 pages), English translation (3 pages).

* cited by examiner

*Primary Examiner*—Joseph D. Torres
(74) *Attorney, Agent, or Firm*—Staas & Halsey LLP

(57) ABSTRACT

A memory control device includes a writing unit writing information to a memory module, a reading unit reading the information from the memory module, an error detecting unit executing a detection of an error in the formation in parallel with the reading operation by the reading unit, an error correcting unit correcting the error in the information containing the error detected, and a control unit controlling a transfer and a receipt of the information to and from an external device and stopping, when the error is detected, an output of the information to the external device.

4 Claims, 5 Drawing Sheets

FIG. 4

20 PART OF LRU

21 ONE ENTRY OF TAGRAM (THAT CORRESPONDS TO ONE WAY, TWO LINES ARE READ AND ONE OF TWO LINE IS USED)

| LINE 0 | | INVERT FLAGS | LINE 1 | | CHECK BITS |
|---|---|---|---|---|---|
| ADDRESS | LOGICAL ADDRESS | LINE STATUS | ADDRESS | LOGICAL ADDRESS | LINE STATUS |

22 CHECK BITS

| WAY0 (LINES 0, 1) | WAY1 (LINES 2, 3) | WAY2 (LINES 4, 5) | WAY3 (LINES 6, 7) |
|---|---|---|---|

| LRU OF SET A |
| LRU OF SET B |

DATA READ BY ACCESSING CERTAIN LINE (CASE OF 4 WAYS)

SET A = {LINES 0, 2, 4, 6}
SET B = {LINES 1, 3, 5, 7}

:LRU FOR SELECTING ONE OF WAYS 0-3 IN SET A LRU IN WAY 0 AND WAY 1
:LRU FOR SELECTING ONE OF WAYS 0-3 IN SET B LRU IN WAY 2 AND WAY 3

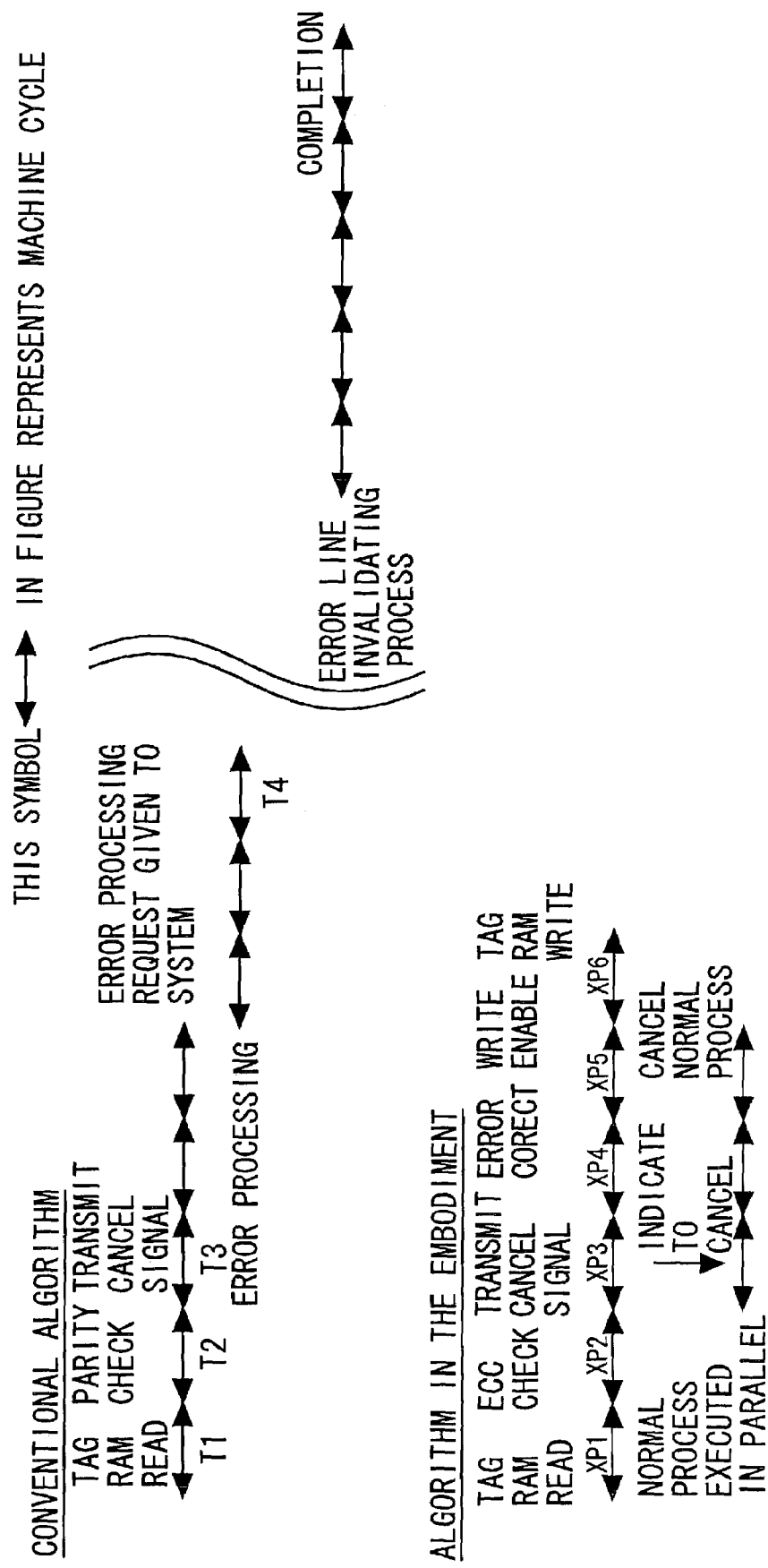

CONTROL SYSTEM AND MEMORY CONTROL METHOD EXECUTING A DETECTION OF AN ERROR IN A FORMATION IN PARALLEL WITH READING OPERATION

BACKGROUND OF THE INVENTION

The present invention relates to control of an access to a memory.

Data on the memory have hitherto been protected by, e.g., a parity check. The parity check is, though capable of detecting an error, incapable of correcting the error. Such being the case, the data of which an error is detected are invalidated on the memory, and data containing no error are read afresh from a data source. According to this method, an access time is delayed to a great degree due to the error correcting process. Further, the case of having detected the error entails the control that the data be invalidated and the error be reported, wherein the logic becomes intricate.

On the other hand, for example, an ECC (Error Check Code)-utilized error correcting circuit is known as an error correcting mechanism on the memory. This error correcting circuit does not require such a troublesome procedure as to invalidate the data and read the data afresh. In the case of using the error correcting circuit, however, the data read from the memory undergo an execution of the error detection and error correction and, after removing the error from the data, undergo an execution of the essential processing.

As explained above, there have been proposed a multiplicity of techniques for protecting the data on the memory. The memory access time is delayed by utilizing the data protection technique described above. This delay is a serious problem especially in a cache memory that needs high-speed accessing.

SUMMARY OF THE INVENTION

It is a primary object of the present invention, which was devised in view of the problems inherent in the prior arts, to provide a memory control technology capable of ensuring a high reliability by having a data error correcting function and exhibiting the same performance as an architecture containing no error correcting mechanism does.

To accomplish the above object, according to one aspect of the present invention, a memory control device has a writing unit writing information to a memory module, a reading unit reading the information from the memory module, an error detecting unit executing a detection of an error in the formation in parallel with the reading operation by the reading unit, an error correcting unit correcting the error in the information containing the error detected, and a control unit controlling a transfer and a receipt of the information to and from an external device and stopping, when the error is detected, an output of the information to the external device.

Herein, the external device is a device that refers to the information stored in the memory module and accesses the memory module via the control unit. Thus, the present memory control device executes detecting the error in the information in parallel with the reading operation by the reading unit, and is therefore capable of reducing a delay of an access speed to the memory module due to the error detection.

Preferably, the memory control device may further has an inverting unit inverting a bit pattern of the error-corrected information, wherein the writing unit may write to the memory module the error-corrected information with its bit pattern inverted when the error is detected.

The scheme of inverting the bit pattern of the error-corrected information can avoid, if there is a fault that a specified bit is fixed to any one of 1 and 0, this fault.

Preferably, the memory module may be stored with plural pieces of unit external information, defined as a unit for transferring and receiving the information to and from the external device, within unit memory information defined as a unit for writing or reading, the reading unit may read the unit memory information from the memory module, the error detecting unit may detect an error in the plural pieces of unit external information contained in the unit memory information, and the control unit may output to the external device the unit external information from which the error is not detected.

Preferably, the error correcting unit may correct the error in the unit external information with the error detected therein, the writing unit may write to the memory module the unit memory information containing the error-corrected unit external information, and the control unit may output the error-corrected unit external information to the external device.

Thus, according to the present memory control device, the memory module stores the plural pieces of unit external information into the unit memory information serving as the unit for writing or reading. Therefore, the plural pieces of unit external information are read by one access to the memory module, and one piece of unit external information among them is outputted to the external device. This scheme enables the unit external information that are not outputted outside to undergo the execution of the error detection and correction beforehand. The error detection and correction can be executed in parallel with the process of outputting other pieces of unit external information tot he external device. It is therefore possible to enhance the data reliability in a way that has decreased the delay of the access time.

According to another aspect of the present invention, there is provided a method in which the processes described above is executed. The control device may execute the process. Herein, the control device includes, e.g., an electronic circuit a logical circuit and so on.

As explained above, according to the present invention, when controlling the memory, it is feasible to ensure the high reliability by incorporating the data error correcting function and to exhibit an almost same level in performance as the architecture having no error correcting mechanism exhibits.

BRIEF DESCRIPTION OF THE DRAWINGS

FIG. 4 is a diagram showing an example of a data structure of data stored in entries of a tag RAM 2; and FIG. 5 is a time chart showing a reading process from the tag RAM 2.

DETAILED DESCRIPTION OF THE PREFERRED EMBODIMENT

An embodiment of the present invention will hereinafter be described with reference to FIGS. 1 through 5.

Figure 1:
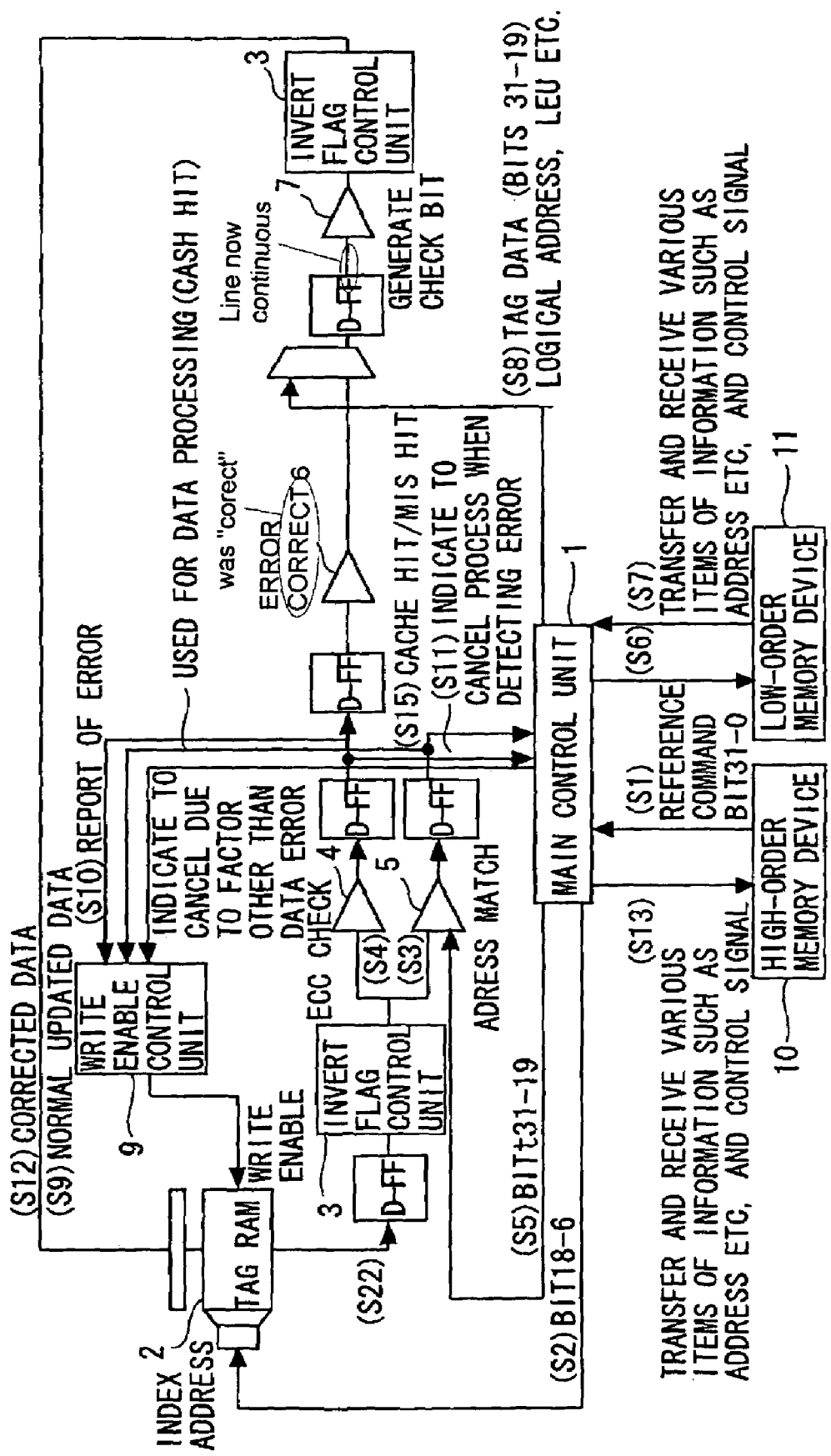
FIG. 1 is a block diagram showing a hardware architecture of a memory control circuit in one embodiment of the present invention.
Figure 2:
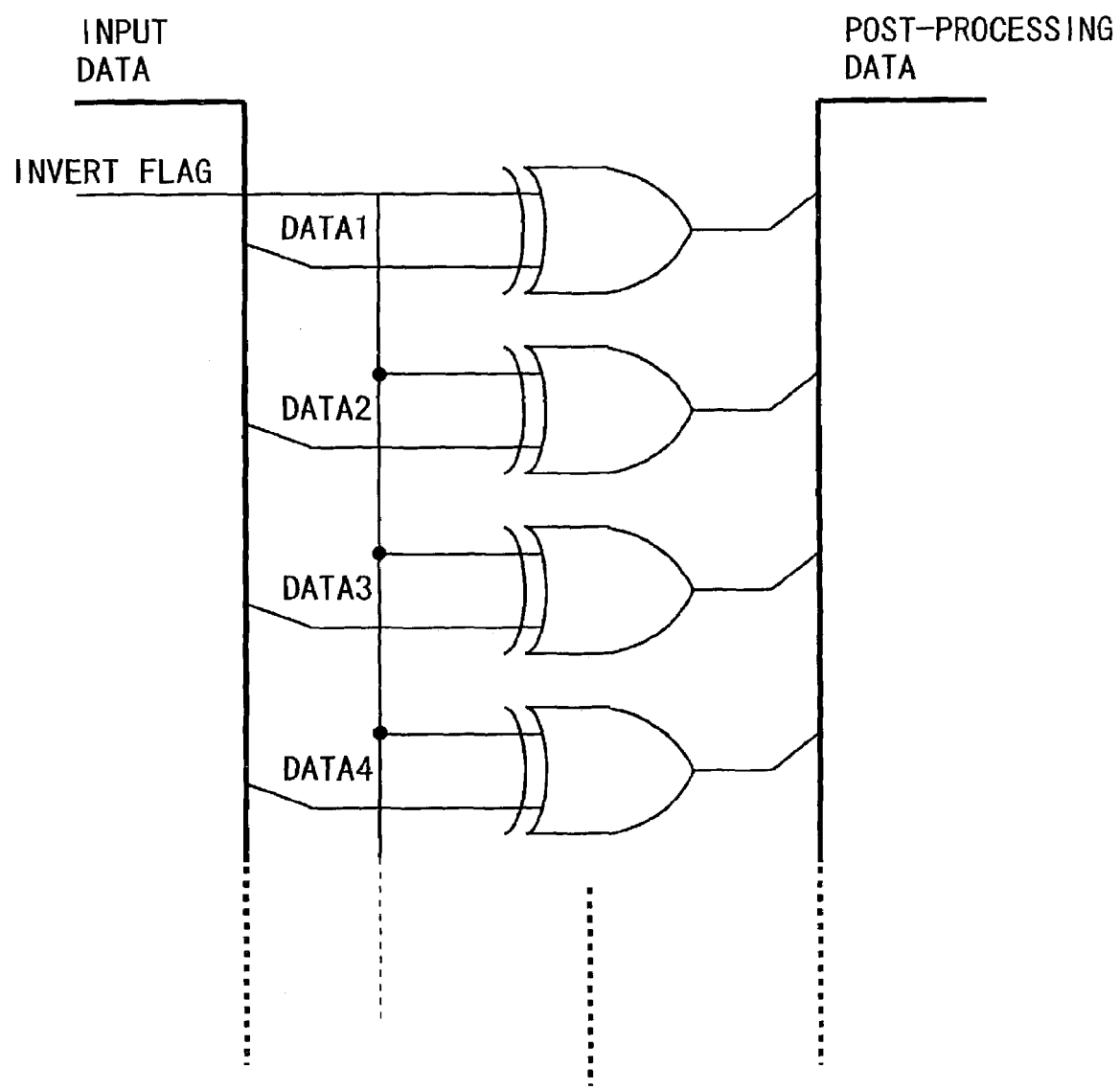
FIG. 2 is a diagram showing an example of an invert flag control unit 3.
Figure 3:
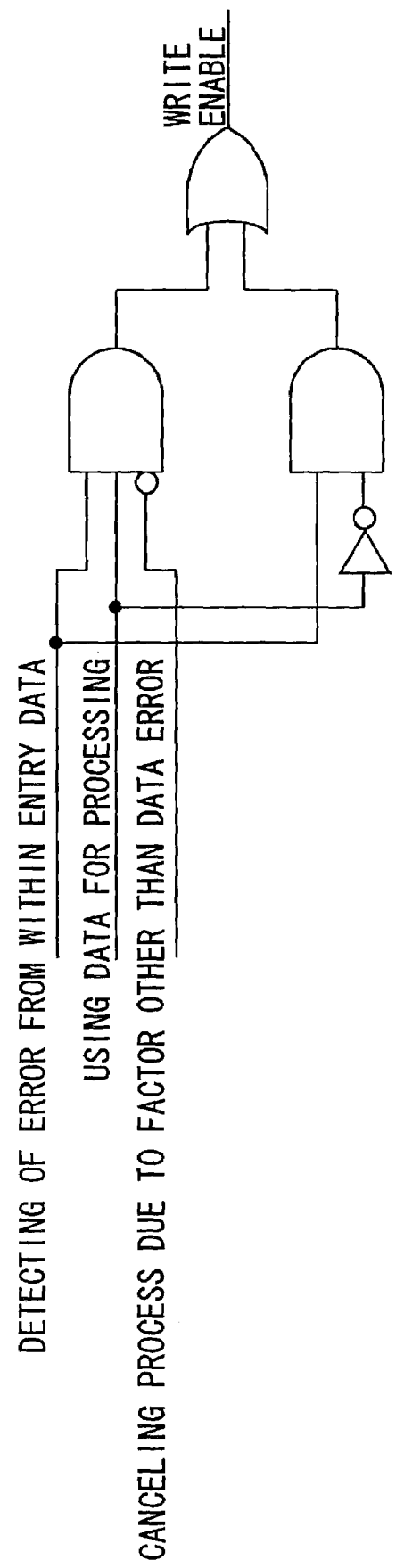
FIG. 3 is a diagram showing an example of a write enable control unit 9.

FIG. 1 is a block diagram showing a hardware architecture of a memory control circuit in one embodiment of the present invention. FIG. 2 illustrates an example of an invert flag control unit 3 shown in FIG. 1. FIG. 3 is a diagram showing an example of a write enable control unit 9. FIG. 4 shows an example of a structure of data stored in entries of a tag RAM 2. FIG. 5 is a time chart showing a reading process from the tag RAM 2.

Hardware Architecture

FIG. 1 is the block diagram showing the hardware architecture of the memory control circuit in one embodiment of the present invention. This memory control circuit includes a tag RAM 2 serving as a component of a cache memory, a data write circuit for writing data to the tag RAM 2, a data read circuit for reading from the tag RAM 2, and a main control unit 1 that controls the data write and read to and from the tag RAM 2.

The tag RAM 2 is a memory configuring a part of the cache memory and is stored with tags. The tag is defined as information indicating which area of the main memory is related to the data stored in each of lines (which may be called blocks) of the cache memory. Each entry of the tag RAM 2 corresponds to each line of the cache memory.

In this embodiment, the memory control circuit will be explained exemplifying a cache memory based on a set associative system. According to the set associative system, the cache memory is structured of a plurality of sets and a plurality of lines within the set. The set associative system is one of techniques of mapping the cache memory and the main memory to each other. In the set associative system, the mapping from the main memory to the set is fixedly determined. Further, the mapping to the line within the set is not fixed and can be set as the scheme intends. In the cache memory in this embodiment, the entry in the tag RAM 2 is stored with information indicating which line within a set the data in a low-order memory device 11 is mapped to.

The entry in the tag RAM 2 is referred to based on an index address retained by the main control unit 1. According to this embodiment, the index address consists of 13 bits (bits 18-6) of an address of data to be cached of the low-order memory device 11.

In the present cache memory, four entries in the tag RAM 2 are accessed in parallel with respect to this index address. These four entries are called ways. The entry of the tag RAM2 is stored with high-order bits (which may be termed a tag and corresponds to high-order 13 bits of, e.g., a 32-bit address in this embodiment) of the address of data to be cached of the low-order memory device 11. According to this embodiment, one entry in the tag RAM 2 consists of two lines. Then, each line is stored with two tags corresponding to two index addresses different in their values by 1 bit.

Note that the index address for referring to the tag RAM 2 is not limited to 13 bits. In any case, the high-order bits (e.g., bits 31-19) of the address of the low-order memory device 11 excluding the index address, may be stored as a tag in the entry of the tag RAM 2.

The data write circuit to the tag RAM 2 includes an error correcting unit 6, a check bit generation unit 7, an invert flag control unit 3 and a write enable control unit 9. As described above, according to this embodiment, the data are written to the four ways of the tag RAM 2, an hence four systems of data write circuits are provided. Referring to FIG. 1, however, for simplifying the illustration, only one system of data write circuit to the tag RAM 2 is shown.

The error correcting unit 6, if a bit error exists in the data stored in the tag TAM2, executes an error correction. The error correction may involve the use of, for instance, the ECC. The check bit generation unit 7 adds ECC check bits to the data.

The invert flag control unit 3 executes an invert process of the data, and sets an invert flag in the inverted data. The invert process is a process of inverting a bit pattern of the original data.

For example, if the data named OxF0 (invert flag 0) in hexadecimal number undergoes an execution of the invert process, this piece of data is changed into data Ox0F (invert flag 1). Accordingly, a true value can be restored by confirming the invert flag.

It is now assumed that a bit position in an address on the memory is destructed and there is no alternative but to take a value of 0. In this case, the data is stored in a way that executes the invert process so that the bit position comes to 0, whereby the on-the-memory address including the destructed bit position can be used.

Further, reversely to the case described above, if there is not alternative but to take a value of 1 for the destructed bit position, in this case also, a fault can be likewise avoided by the invert process. If 2 or more bits of the one entry of the tag RAM 2 are destructed, however, this method is incapable of avoiding the bit error.

FIG. 2 shows an example of a configuration of the invert flag control unit 3. In this example, the invert process is actualized by laying out exclusive OR (ExclusiveOR) gates. Referring again to FIG. 2, bits of the input data and the invert flag are inputted to the exclusive OR gates, and outputs thereof become post-processing data.

As a result, when the invert flag is 1, the bit of 0 of the input data becomes 1, while the bit of 1 of the input data becomes 0. The bit pattern of the input data is thereby inverted. While on the other hand, when the invert flag is 0, the input data are outputted intact as the post-processing data.

The write enable control unit 9 judges a write enable condition to the tag RAM 2, and generates a so-called write enable signal. FIG. 3 shows the example of the write enable control unit 9. As illustrated in FIG. 3, if an error (bit error) is detected in the entry data read from the tag RAM 2, if the data thereof is coincident with data referred to from the high-order memory device 10 (corresponding to an external device) (when the data is used for processing) and if the processing of the same data is not canceled due to a factor other than the data error, the write enable signal is asserted (for instance, the write permission is outputted.

Further, if the error data is not the data referred to from the high-order memory device 10 (when the data is not used for processing), the write enable signal is asserted unconditionally.

The data (used for processing) referred to from the high-order memory device 10 is one item of data, actually referred to from the high-order memory device 10 (e.g., a CPU etc), of two items of data of two readout lines, which are stored in one entry of the tag RAM 2.

The case that the processing is canceled due to the factor other than the data error is specifically a case where there are, for example, two consecutive accesses to the same line at every one cycle, and it proves that a cache mistake occurs in the first access. In this case, the subsequent access to this line is to be canceled. Due to the cache mistake proven, the data is again referred to from the low-order memory device 11 and cached in the cache memory. In such a case, the present memory control circuit cancels the subsequent access thereby keeping a data compatibility.

If the error data is data used for process and if the processing is not canceled due to the factor other than the data error, the memory control circuit in this embodiment enables the error-corrected data to be written. Further, if the error data is data that is not used for processing, the memory control circuit in this embodiment unconditionally enables the error-corrected data to be written. In any case, however, the other non-error line of the two lines stored in one entry is overwritten as it is.

The data read circuit from the tag RAM 2 includes an ECC check unit 4 and an address matching unit 5 that are connected in parallel with the output of the invert flag control unit 3, and an error correcting unit 6 connected to an output side of the ECC check unit 4. According to this embodiment, the parallel readout from the four ways of the tag RAM 2 involves providing four systems of data read circuits. Referring again to FIG. 1, however, for simplifying the illustration, only one system of data read circuit from the tag RAM 2 is shown.

The ECC check unit 4 checks whether there is a bit error in the data read from the tag RAM 2. A result of the bit error check is transmitted as an error report (S10) to the write control unit 9 and as a processing cancel indication (S11) in case of detecting the error to the main control unit 1. The error correcting unit 6 corrects the bit error of the data of which the error has been detected by the ECC check unit 4.

The address matching unit 5 compares a tag inputted from the main control unit 1 with four tags area from the four ways of the tag RAM 2, and thus judges whether the tags are coincident, i.e., whether the data referred to is hit. The processing by this address matching unit 5 is executed in parallel with the processing by the ECC check unit 4 and in a way that sets the four ways in parallel. Then, a signal (cache hit/mis-hit (S15)) indicating whether the data is hit is outputted for every way to the main control unit 1.

The main control unit 1 receives a reference command from the high-order memory device 10, and refers to line data in the tag RAM 2 and line data in an unillustrated data RAM corresponding to the tag RAM 2. Then, the main control unit 1 outputs the hit data to the high-order memory device 10. The high-order memory device 10 is, e.g., a CPU (Central Processing Unit) of a computer.

Further, the main control unit 1, if the cache is not hit, refers to the low-order memory device 11 and stores necessary items of data in the lines of the tag RAM 2 and in the lines of the unillustrated data RAM corresponding to the tag RAM 2. The low-order memory device 11 is, e.g., a main memory of the computer. The main control unit 1 is constructed of logic circuits for inputting and outputting the signals described above.

Data Structure of Tag RAM 2

FIG. 4 shows the example of the data structure of the data stored in the entries of the tag RAM 2. As explained above, according to this embodiment, the cache memory is based on the set associative system and is structured of the plurality of sets. Further, each set consists of the four ways accessible in parallel. Moreover, each of the ways includes the tag RAM2 for storing the tags and lines of the data RAM for storing the data corresponding to each tag (wherein the line is also known as a block that is a unit for transferring and receiving the data to and from the low-order memory device 11).

Further, as described above, according to this embodiment, one entry of the tag RAM 2 is stored with the two tags. For example, a way 0 is stored with lines 0 and 1, a way 1 is stored with lines 2 and 3, a way 2 with lines 4 and 5, and a way 3 with lines 6 and 7, respectively. Hence, the ways 0 through 3 substantially configure two sets. Herein, the set consisting of the lines 0, 2, 4 , 6 is called a set A. Further, the set consisting of the lines 1, 3, 5, 7 is called a set B.

FIG. 4 shows a detailed structure of the entry of the tag RAM 2 contained in one way (way 0). Herein, a focus is put on the tag RAM 2, wherein a structure of the data RAM for storing the data is omitted.

In the present embodiment, the entry of the tag RAM 2 is structured of a part-of-LRU field 20, data related to line 0, invert flag filed 21 and data related to line 1 and check bit field 22.

The LRU field 20 is stored with a part (3 bits) of the LRU bits. Further, the LRU field 20 of the way 0 and the LRU field of the way 1 configure the LRU bits (6 bits) of the whole set A. Furthermore, the LRU field of the way 2 and the LRU field of the way 3 configure the LRU bits (6 bits) of the whole set B.

The LRU bits are bits for selecting the way in which to the data is purged at next time (for storing the data afresh) from among the four ways configuring the single set. An LRU (Least Recently Used) algorithm is broadly known as a memory management method and a main memory management method in a virtual memory system. According to this algorithm, the way is selected from among the four ways so that the data accessed earliest is thrown out first.

The LRU field 20 is stored with a bit string indicating such a way selection order. It is known that information showing the order of selecting the four ways requires a combination number $_4C_2=6$ bits for selecting two of the four ways. This is because it may be sufficient that there are pieces of information for setting a time-based relationship between the four ways in sequence.

According to this embodiment, the way 0 is stored with 3 bits of the information of 6 bits indicating the selection order of the four ways in the set A. further, the remaining 3 bits are stored in the way 1.

The line-0 field is stored with an address defined as a tag of the cache memory, a logical address of the cached data, and a line status. In this embodiment, the tag has the high-order 13 bits of the address in the low-order memory device 11. Further, the logical address is an address given to the cached data in the high-order memory device 10. The address in the low-order memory device 11 and the logical address are transferred as parameters of the reference command from the high-order memory device 10.

In this embodiment, however, the logical address is not indispensable component. Namely, the logical address may not be used in the high-order memory device 10, and the data may be accessed by a direct link to the address.

The line status is information showing whether the data in the line concerned is valid, information indicating whether the data in the line concerned is coincident with the data in the low-order memory device 11, and so on. If the data in the line concerned is invalid, this case might occur in a multi-processor system where in a plurality of processors each having the cache memory share the data in the low-order memory device 11 with each other. This is, for instance, a case in which the data in the cache memory of a certain processor is rewritten in the cache memory of other corresponding processor, and a consequence thereof reflects in the low-order memory device 11, with the result that the data in the cache memory of the processor concerned becomes invalid.

The information indicating whether the data in the line concerned is coincident with the data in the low-order memory device 11, is known as dirty bits in a so-called write-back system (which may also called a store-back system, a store-in system and a swap system). The embodiment of the present invention is not, however, limited the write-back system and can be carried out also in a write-through system. In this case, the dirty bits are not necessarily required.

The invert flag 21 is a flag for indicating whether the bit pattern in the entry is inverted. Note that the invert flag 21 is multiplexed over 3 bits, and a reliability is ensured by judging this value on the basis of the decision by majority in this embodiment.

When this flag is "1", this implies that the entry of the tag RAM 2 is inverted. An initial value of this flag is "0", and the value is inverted each time an error is detected in this entry.

If this flag is "1" when reading from the tag RAM 2, the entry thereof has been inverted, and hence the ECC-based error check and the address matching are executed after restoring it by inverting again.

As described above, according to this embodiment, one entry of the tag RAM 2 is stored with data in the two lines. Referring to FIG. 4, the line 1 contains the data of such a second line, and its data structure is the same as the line 0 has.

The check bit field 22 is stored with check bits for detecting and correcting the bit error in the entry concerned. These check bits identify a bit position where the error occurred.

Operation

An operation of the memory control circuit will be explained based on a flow of signals (indicated by arrowheads marked with S1 through S13) in FIG. 1. What is now assumed is a case where the high-order memory device 10 issues the reference command of referring to the data in the cache memory.

The reference command is inputted to the main control unit 1 together with the address (the bits 31-0) of the low-order memory device 11 to be referred to and the logical address (S1). The main control unit 1 selects the bits 18-6 from the address contained in the reference command and inputs the same bits as an index address to the tag RAM 2 (S2). Further, the main control unit 1 selects the bits 31-19 from the address contained in the reference command and inputs the same bits to the address matching unit 5 (S5).

The tag RAM 2 selects a set corresponding to the inputted index address, operates the four ways in parallel, and reads the data in the entry of each way (S22) As described above, however, only one system of read circuit is illustrated herein.

Next, the invert flag processing unit 3, based on the invert flag, receives the data from a D-FF and executes the invert process (if the invert flag is off, however, the data is not inverted). One of the output signals of the invert flag control unit 3 is inputted to the ECC check unit 4 (S4), while the other signal is inputted to the address matching unit 5 (S3).

The address matching unit 5 executes an address matching process in parallel with respect to the data (tags) read out of the four ways. The address matching process involves comparing the bits 31-19 of the address of the low-order memory device 11 that have been inputted from the main control unit 1 with contents of the tags read out of the tag RAM 2.

Then, as a result of the comparison, the main control unit 1 receives an input of a signal (S15) indicating a cache hit with respect to the way having the two inputs (S3, S5) that have been coincident with each other, through a D-FF. Further, as the result of the comparison, the main control unit 1 receives an input of a signal (S15) indicating a mis-hit with respect to the way having the two inputs (S3, S5) that have not been coincident with each other. The main control unit 1 reads the data from the lines of the unillustrated data RAM corresponding to the hit way, and transfers the readout data to the high-order memory device 10 (S13).

On the other hand, the ECC check unit 4 executes a detection of the bit error in parallel with the each of the ways as well as in parallel with the process of the address matching unit 5 described above. To be more specific, the ECC check unit 4 checks the bit error in the data read out of the ways in parallel.

Then, when detecting the bit error, the ECC check unit 4 transmits an error report to the write enable control unit 9 (S10) through a D-FF. Further, when detecting the error, the ECC check unit 4 transmits a process cancel indication to the main control unit 1 (S11). With this indication, the main control unit 1 stops reading the data from the line of the data RAM that corresponds to the cache hit signal (S15), and executes a rereading process.

Moreover, the data of the way with the error detected therefrom is inputted to the error correcting unit 6, wherein the error is corrected and output through a D-FF. The bits containing the error occurred undergo an execution of the error correction.

Then, the check bit generation unit 7 attaches a check bit. Further, the data attached with the check bit is inputted together with the invert flag to the invert flag control unit 3.

The invert flag control unit 3 executes the invert process each time the data containing the error corrected is inputted, and writes the processed data to the tag RAM 2 (S12). Namely, in the present memory control circuit, the data, of which the error has been corrected by the data with the bit error detected, undergoes the invert process and then written to the tag RAM 2.

At this time, the write enable signal is asserted based on the error report (S10). The written data is read in the same procedure as described above in the rereading process.

If all the ways are not hit in the address matching unit 5, only the mis-hit is transmitted to the main control unit 1 (S15). In this case, the main control unit 1 refers to the low-order memory device 11 (S6) and reads the data referred to based on the reference command (S1)(S7).

Then, a way that should be a throw-out target is determined based on a known algorithm by referring to the LRU of the tag RAM 2. Then, the tag data (the bits 31-19 of the address of the low-order memory device 11), the logical address and the line status (see FIG. 4), are written to this throw-out target way (S8).

In this case, as shown in FIG. 4, one entry of the tag RAM 2 is stored in overlap with the contents of the two index addresses different by 1-bit value. The data in the write target line (e.g., the line 0 or 1 contained in the way 0) are updated, while the data in the write non-target line are written intact again to the tag RAM 2. Further, as for the write non-target way, the LRU bits are updated and again written to the tag RAM2. This writing is executed in parallel with respect to the four ways.

FIG. 5 is the time chart showing the reading procedure from the tag RAM2. FIG. 5 shows a case using a conventional technique and a case using the memory control circuit in this embodiment for a comparison.

In the case of using the conventional technique, e.g., the parity check, the data are read from the tag RAM 2 (T1), the parity check is executed (T2), and a cancel signal is transmitted when detecting the error (T3). Then, after an elapse of predetermined machine cycles (which are two cycles in FIG. 5), the error process is started and requested of the system (e.g., the CPU) (T4), and, after a further elapse of the predetermined machine cycles, the error line undergoes an execution of an invalidating process. Based on this invalidating process, the data in the line concerned are read from the low-order memory device 11 etc.

On the other hand, according to the memory control circuit in this embodiment, the data are read from the tag RAM (XP1), the ECC check is executed (XP2), and the cancel signal is transmitted when detecting the error (XP3) This cancel signal cancels a normal process (for instance, the address matching, or the data reading process from the line of the data RAM that corresponds to the tag matched thereafter) in the midst of being executed in parallel with the ECC check.

Moreover, after transmitting the cancel signal, the error correction (XP4) is executed, the write enable signal is asserted (XP5), and the corrected data are written to the tag RAM 2 (XP6)

As discussed above, according to the memory control circuit in this embodiment, the ECC-based data check and the normal operation are performed in parallel, thereby reducing a cache access time in a way that enhances the reliability. Therefore, this memory control circuit exhibits a almost same level in performance as the cache memory having no ECC does if the data does contain any error. Further, when detecting a correctable error, this memory control circuit executes the error correction in a short period of time without rereading the data from the low-order memory device 11 etc.

Moreover, in the present memory control circuit, one entry of the cache memory is stored with the plurality of lines. This structure enables the error check and the error correction to be executed also with respect to the data that are not in the process of being referred to, in parallel with the error check of the data that are now being referred to, and the decrease in the access time can be prevented in a way that improves the reliability.

Further, the present memory control circuit writes the data with its bit pattern inverted to the entry in which the error occurs. Therefore for such a memory fault that where a bit always becomes 1, or alternatively for such a memory fault that a bit always becomes 0, if it is a 1-bit fault in one entry, the present memory control circuit can avoid such a fault.

Modified Example

The embodiment discussed above has exemplified the memory control circuit that reads and writes the data from and to the tag RAM 2. The embodiment of the present invention is not, however, limited to the tag RAM2. Namely, the present invention may be applied to, for example, a normal main memory and a cache memory of the hard disk and so on. Further, the cache memory is not confined to the set associative system.

The embodiment discussed above has exemplified the 4-way cache memory. In the case where the present invention is applied to the cache memory, the number of the ways is not restricted to 4 and may be equal to or smaller than 2 and equal to or larger than 8.

The embodiment discussed above has exemplified the ECC utilized for detecting and correcting the bit error. The embodiment of the present invention is not, however, limited to the ECC-based bit error detection and correction.

What is claimed is:

1. A memory control device using a tag, comprising:
a writing unit writing information to a tag memory module;
a reading unit reading the information from said tag memory module;
a matching unit judging whether the information from said tag memory module is coincident to a tag inputted from a control unit of said memory control device;
an error detecting unit executing a detection of an error in the information in parallel with the judging operation by said matching unit;
an error correcting unit correcting the error in the information containing the error detected;
a control unit controlling a transfer and a receipt of the information to and from an external device and stopping, when the error is detected, an output of the information to said external device; and
an inverting unit inverting a bit pattern of the error-corrected information,
wherein said writing unit writes to said tag memory module the error-corrected information with its bit pattern inverted after the error is corrected and sets an invert flag of the error-corrected information to indicate that the bit pattern is inverted; and
wherein the inverting unit inverts a bit pattern of the information read from said tag memory module in response to an invert flag indicating that the bit pattern of the read information is inverted.

2. A memory control device using a tag, comprising:
a writing unit writing information to a tag memory module;
a reading unit reading the information from said tag memory module;
a matching unit judging whether the information from said tag memory module is coincident to a tag inputted from a control unit of said memory control device;
an error detecting unit executing a detection of an error in the information in parallel with the judging operation by said matching unit;
an error correcting unit correcting the error in the information containing the error detected; and
a control unit controlling a transfer and a receipt of the information to and from an external device and stopping, when the error is detected, an output of the information to said external device
wherein said tag memory module stores plural pieces of external information block, defined as an external block information for transferring and receiving the information to and from said external device, within a memory information block defined as an internal information block for writing or reading data internally, indicating which area of the memory is related to the data stored;
said reading unit reads the memory information block from said tag memory module;
said error detecting unit executes detection of an error in the external information block of a reading target together with another external information block other than the reading target, contained in the memory information block;
said control unit outputs to said external device the external information block of the reading target from which the error is not detected and keeps the external information block other than the reading target from which the error is not detected in said tag memory module;
said error correcting unit corrects the error in the external information block with the error detected therein;
said writing unit writes to said tag memory module the memory information block containing the error-corrected external information block; and
said control unit outputs the error-corrected external information block to said external device.

3. A memory control method using a tag, the method comprising:
writing information to a tag memory module;
reading the information from said tag memory module;
judging whether the information from said tag memory module is coincident to a tag inputted from a control unit;
executing a detection of an error in the information in parallel with the judging;

correcting the error in the information containing the error detected;

controlling a transfer and a receipt of the information to and from an external device and stopping, when the error is detected, an output of the information to said external device; and inverting a bit pattern of the error-corrected information;

wherein the writing involves writing to said tag memory module the error-corrected information with its bit pattern inverted after the error is corrected and setting an invert flag of the error-corrected information to indicate that the bit pattern is inverted; and wherein a bit pattern of the information read from said tag memory module is inverted in response to an invert flag indicating that the bit pattern of the read information is inverted.

4. A memory control method using a tag, the method comprising:

writing information to a tag memory module;

reading the information from said tag memory module;

judging whether the information from said tag memory module is coincident to a tag inputted from a control unit;

executing a detection of an error in the information in parallel with the judging;

correcting the error in the information containing the error detected; and controlling a transfer and a receipt of the information to and from an external device and stopping, when the error is detected, an output of the information to said external device;

wherein said tag memory module stores plural pieces of external information block, defined as an external block information for transferring and receiving the information to and from said external device, within a memory information block defined as an internal information block for writing or reading data indicating which area of the memory is related to the data stored;

the reading involves reading the memory information block from said tag memory module;

the detecting the error involves detecting an error in the external information block of a reading target together with another external information block other than the reading target, contained in the memory information block;

the controlling involves outputting to said external device the external information block of the reading target from which the error is not detected and keeping the external information block other than the reading target from which the error is not detected in said tag memory module;

the error correction involves correcting the error in the external information block with the error detected therein;

the writing involves writing to said tag memory module the memory information block containing the error-corrected external information block; and the controlling involves outputting the error-corrected external information block to said external device.

* * * * *